INVENTOR.
Yasusaburo Kobori

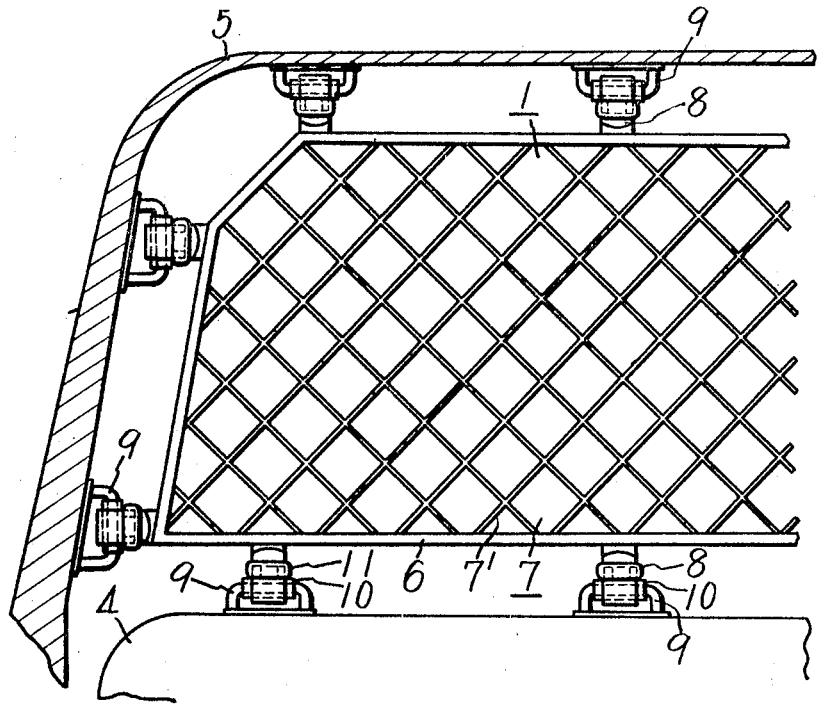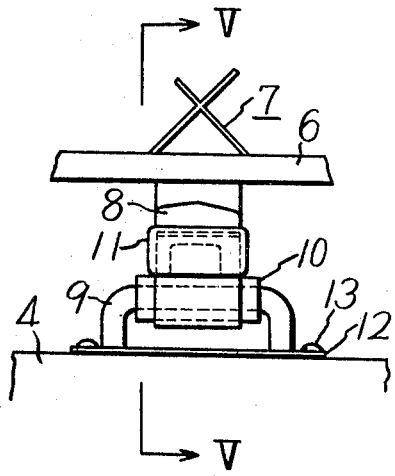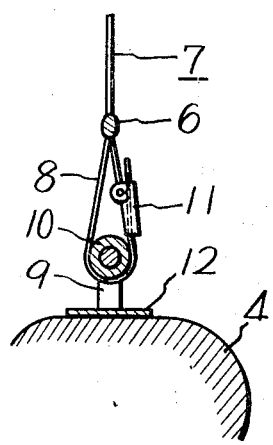

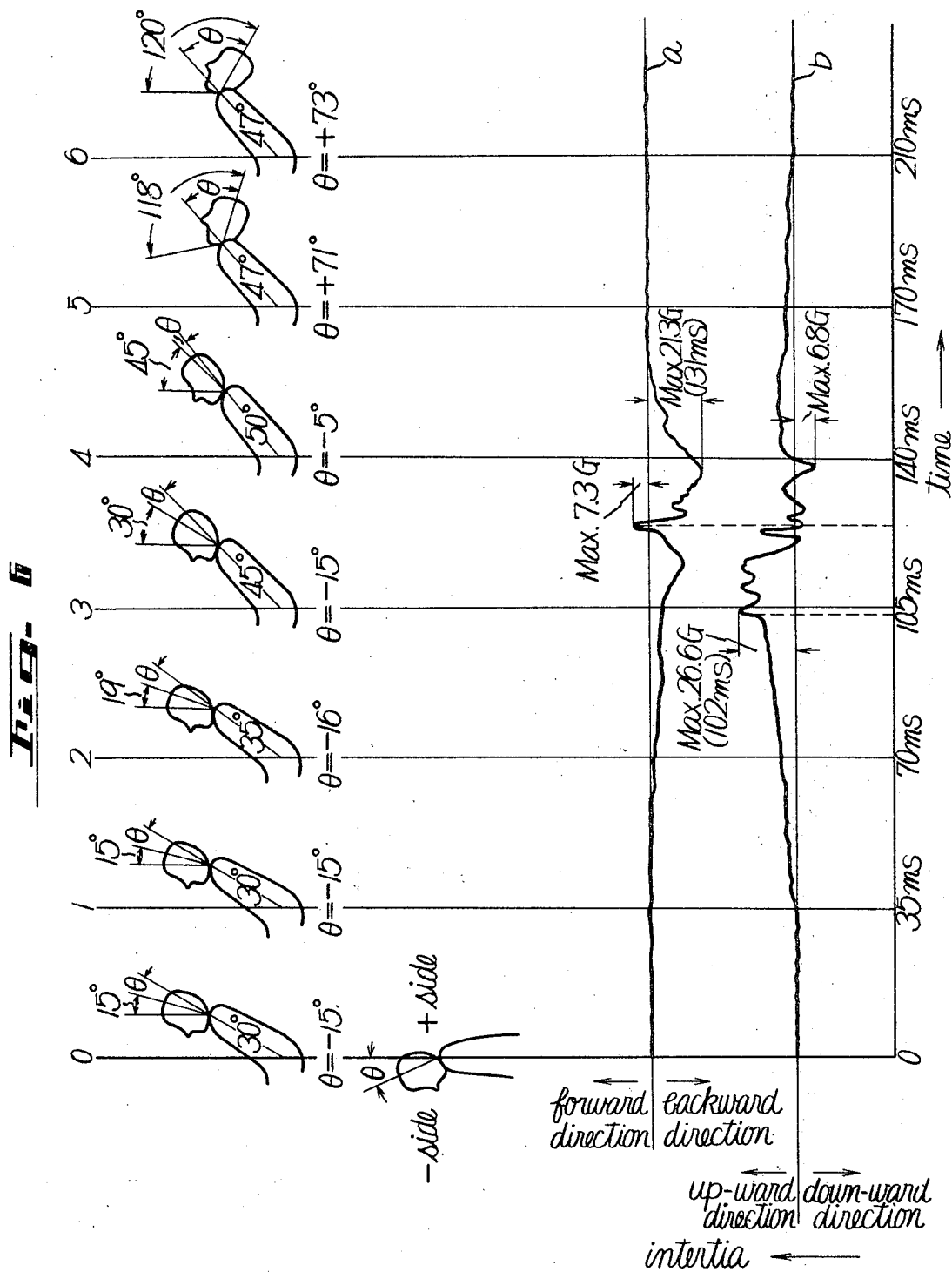

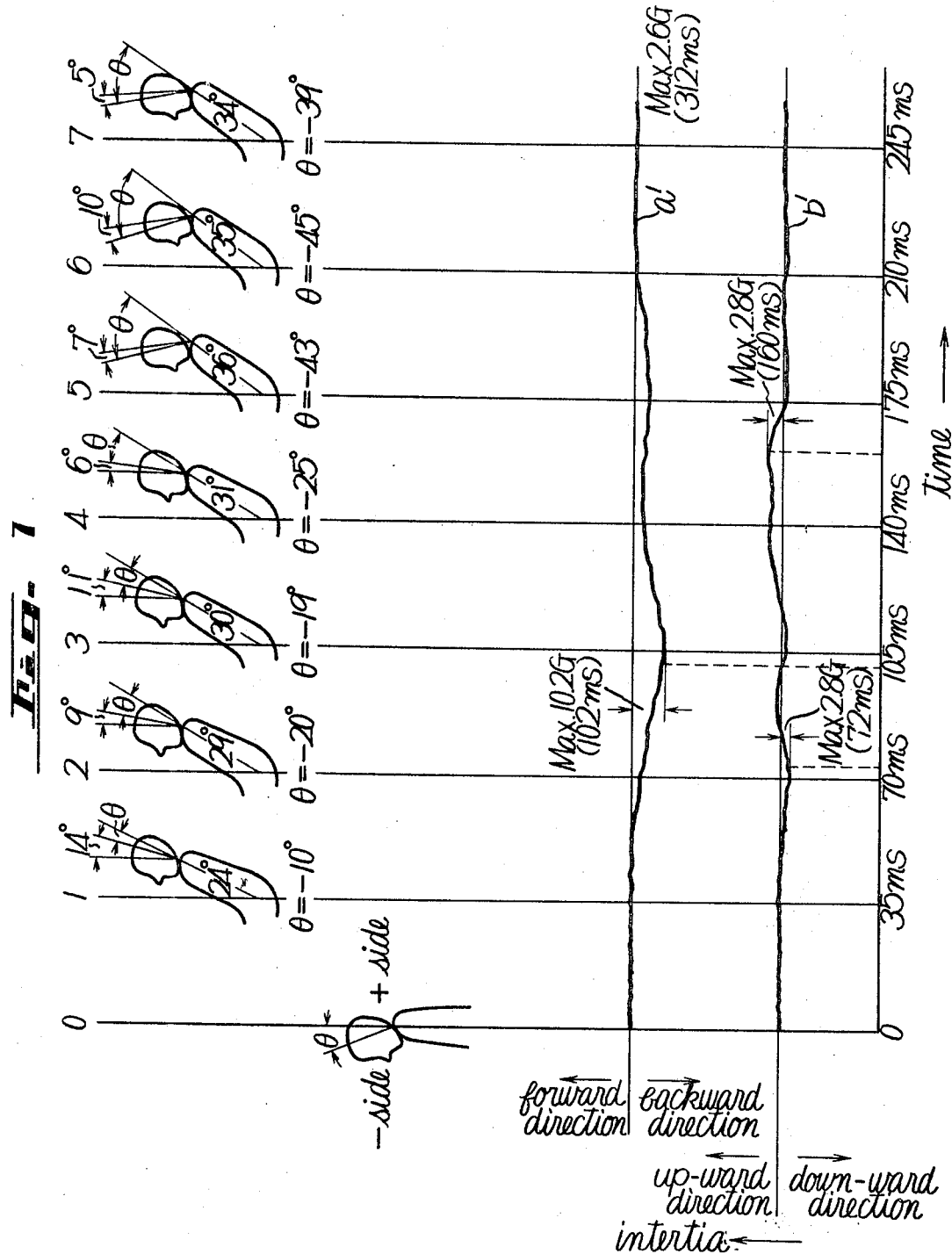

Aug. 25, 1970   YASUSABURO KOBORI   3,525,535
SAFETY DEVICE FOR VEHICLE PASSENGERS
Filed Feb. 14, 1968   14 Sheets-Sheet 6

INVENTOR.
Yasusaburo Kobori

BY _____ ATTORNEYS

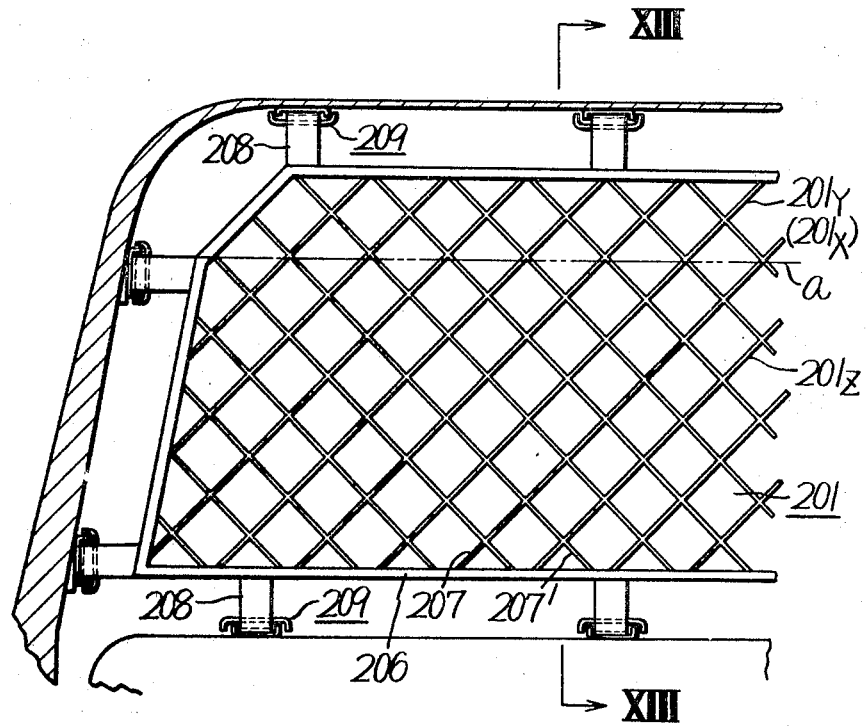
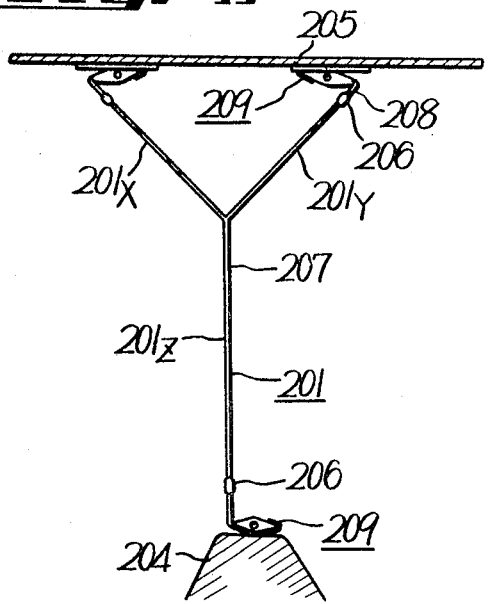

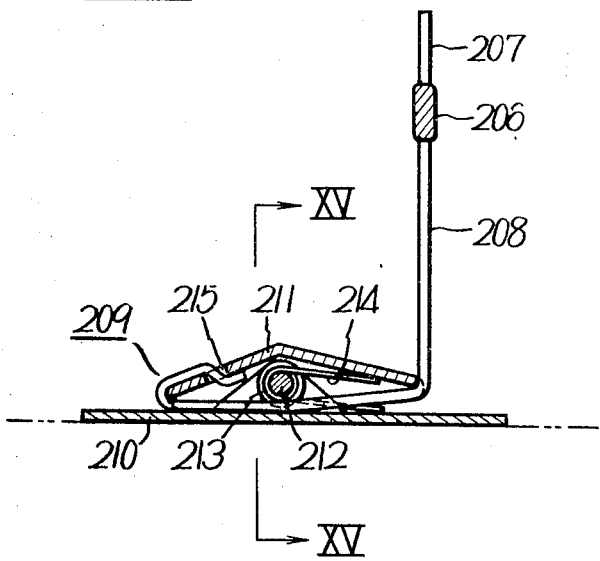
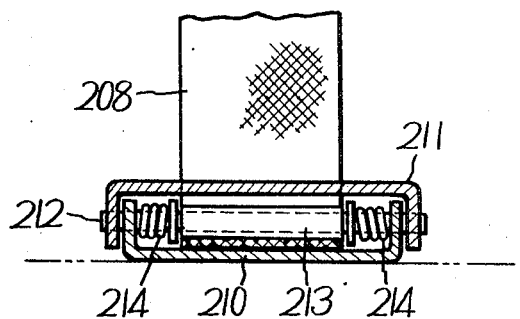

Aug. 25, 1970  YASUSABURO KOBORI  3,525,535
SAFETY DEVICE FOR VEHICLE PASSENGERS

Filed Feb. 14, 1968  14 Sheets-Sheet 11

INVENTOR.
Yasusaburo Kobori

BY
ATTORNEYS

INVENTOR.
Yasusaburo Kobori

BY *Nice, Sherman, Meroni, Gross & Simpson* ATTORNEYS

Aug. 25, 1970  YASUSABURO KOBORI  3,525,535
SAFETY DEVICE FOR VEHICLE PASSENGERS
Filed Feb. 14, 1968  14 Sheets-Sheet 14
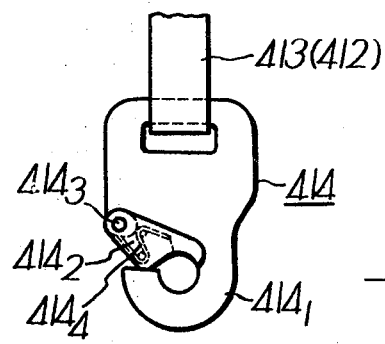
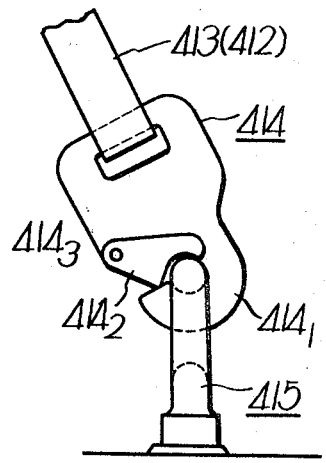
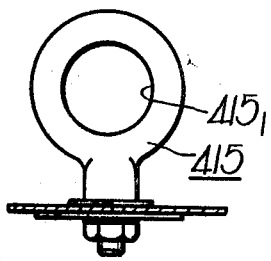
INVENTOR.
Yasusaburo Kobori
BY ATTORNEYS United States Patent Office 3,525,535
Patented Aug. 25, 1970

3,525,535
SAFETY DEVICE FOR VEHICLE PASSENGERS
Yasusaburo Kobori, Tokyo, Japan, assignor to Kabushiki-kaisha G.I.C., Tokyo, Japan, a corporation of Japan
Filed Feb. 14, 1968, Ser. No. 705,469
Claims priority, application Japan, Feb. 18, 1967, 42/10,294; June 30, 1967, 42/42,103
Int. Cl. B60r 21/02
U.S. Cl. 280—150                7 Claims

ABSTRACT OF THE DISCLOSURE

A safety device for vehicle passengers having a net capable of being extended by an external force applied thereto and restored to some extent from its extended condition upon removal of the external force, a frame for supporting the net in a taut condition at its inherent initial tension, and means for securing the net in the vehicle compartment at such a location that the passengers' heads are thrown against the net supported by the frame in the event of a vehicle crash.

BACKGROUND OF THE INVENTION

Field of the invention

This invention relates to a safety device for vehicle passengers, and more particularly to a safety device for the protection of passenger in automobiles or other moving vehicles when involved in an accident such as a head-on or rear-end collision.

Description of the prior art

The majority of injuries to vehicle passengers in the event of a rear-end collision is the breakage of their necks or the so-called "whiplash" injury. Heretofore, some safety devices such, for example, as an auto-pillow (a head support) have been proposed for the protection of the vehicle passengers from such injuries when involved in an accident. The auto-pillow mentioned above is mounted on the top of the back of the seat at a place corresponding to the back of the head of the passenger for preventing breakage or excessive movement (or inclination) of his neck in a rear-end collision.

The "Federal Motor Vehicle Safety Standard" of the United States of America provide that automobiles should be equipped with means for preventing the inclination angle of the passenger's head from exceeding 60° in the case of a rear-end crash. In order to fulfill this requirement, it is preferred that the auto-pillow is so constructed and mounted on the back of the seat as to withstand an inertial force of approximately 50 G. The reason is that if the inclination angle of the passenger's neck could be held less than 60°, his head would strike against the auto-pillow at an inertial force of about 50 G.

The auto-pillow is made of relatively hard materials, so that when the neck of the passenger hits the auto-pillow at an inertial force of about 50 G in a crash, his neck is thereby subjected to an impact of approximately 50 G due to reaction. According to the "Federal Motor Vehicle Safety Standards" of the United States, the force of 50 G inflictes concussion of the brain upon the passenger, and hence is considerably injurious to him. Further, in this case, there is a possibility to cause repulsion of the auto-pillow, that is, the so-called "whiplash" phenomenon. In addition to this, it is very difficult to mount the auto-pillow on the seat in a manner to bear up against an impact of 50 G or so. The auto-pillow now in wide use is usually attached to the seat by means of snaps, so that the auto-pillow itself is readily taken off from its attachment portion when subjected to a shock of the aforementioned value and cannot serve to hold the inclination of the passenger's neck within 60°. In addition, since the auto-pillow is made up of opaque materials, it has a disadvantage to obstruct the passenger's view, especially the driver's.

Another example of the conventional safety devices for use in automobiles is a wire netting stretched between the top of the back of the front seat and the ceiling of the compartment. This is to prevent an occupant of the rear seat, especially his head from striking against the driver of the front seat in the case of sudden stoppage or a crash of the moving vehicle. This conventional safety device is different in object from the present invention. Further, the wire netting does not perform the function of this invention described later such as damping and absorption of the inertial force of the passenger thrown against the netting, and this prior device is attended by a drawback such as the likelihood of inflicting injury to the passenger when he is thrown against the wire netting.

Further, there has been proposed a similar safety device employing a large-meshed net made up of cords of an elastic material such as rubber or the like in the manner of plain fabrics. The net is stretched from the ceiling of the vehicle compartment down to the floor of the vehicle along the front of the back seat. This prior art net is to restrain the occupants, chiefly children of the back seat from leaving the seat to disturb the driver in the front seat during travel of the vehicle and to prevent injury to them in the event of a crash. However, the object of the conventional safety net differs from that of the present invention which lies particularly in the protection of the heads of the passengers of an automobile from "whiplash" injuries when involved in a rear-end collision or the like. In addition, since the conventional safety net is quite different in construction from the safety net of this invention described later, the prior net cannot be expected to secure the operational effect of the safety device of this invention such that the inertial force of the passenger's head striking against the net is absorbed and damped without applying repulsive force to the head.

SUMMARY OF THE INVENTION

The present invention is directed to a novel safety device for vehicle passengers which is free from the drawbacks encountered in the conventional safety devices such as the auto-pillow and so on, easy to manufacture, easy to handle and inexpensive.

BRIEF DESCRIPTION OF THE DRAWINGS

FIG. 3 is a fragmentary view in elevation of the safety device of this invention;

FIG. 4 is an enlarged front view illustrating one example of means for securing the safety device of this invention in the automobile;

FIG. 5 is a longitudinal-sectional view taken along the line V—V in FIG. 4;

FIG. 6 is a diagram showing an inertial force applied to a dummy of an automobile not equipped with the safety device of this invention in the case of a rear-end collision and the varying condition of the dummy's body due to the inertial force;

FIG. 7 is a diagram, similar to FIG. 6, showing the inertial force to the dummy and the varying condition of its body in an automobile equipped with the safety device of this invention in the event of a rear-end collision;

FIG. 12 is an enlarged fragmentary view of FIG. 11;

FIG. 13 is a longitudinal-sectional view taken along the line XIII—XIII in FIG. 12;

FIG. 14 is an enlarged fragmentary view of FIG. 13;

FIG. 15 is a cross-sectional view taken along the line XV—XV in FIG. 14;

FIG. 28 is a front view showing one example of a snap hook employed in the securing means shown in FIGS. 22 and 23;

FIG. 29 is a front view showing one example of an eyebolt for receiving the snap hook depicted in FIG. 28; and FIG. 30 is a diagram showing the snap hook and the eyebolt in engagement with each other.

DESCRIPTION OF THE PREFERRED EMBODIMENTS

With reference to the drawings, the present invention will be described. Briefly stated, the safety device of this invention employs a net formed of cords capable of being extended by an external force applied thereto and restored to some extent from its extended condition upon removal of the external force, which net is stretched on a frame in a taut condition at its inherent initial tension, and the frame is installed in the vehicle compartment at such a location that in the case of a collision the head of a passenger would strike against the net laid on the frame due to the inertial force of the head caused by the impact of the crash, permitting the net to damp and absorb the inertial force of the passenger's head.

Figure 1:
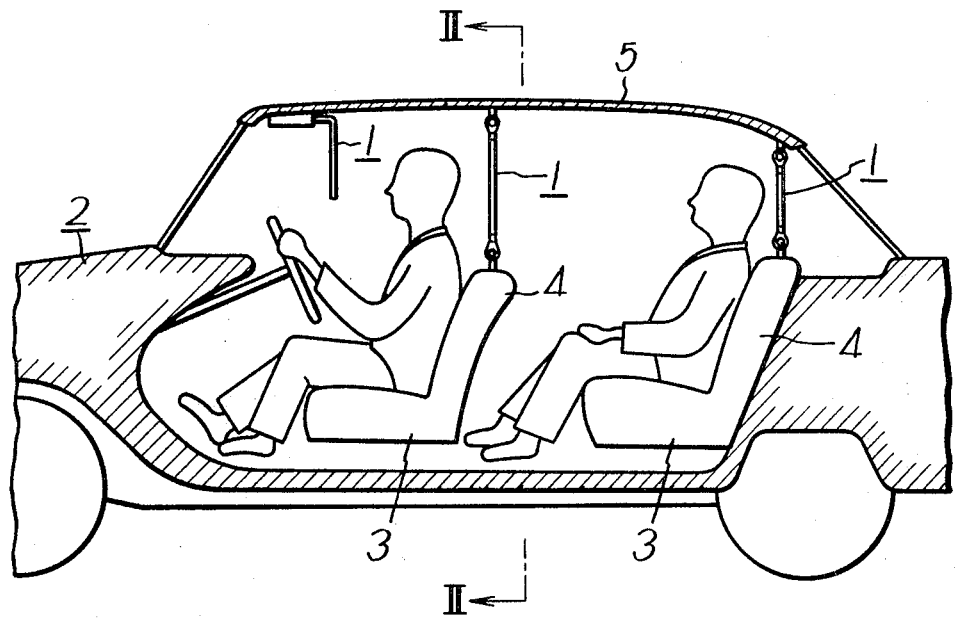
FIG. 1 is a side view of an automobile equipped with one example of the safety device (safety net) of this invention having one portion of the automobile broken away.

This invention will hereinafter be described in detail as applied to an automobile. In FIG. 1 reference numeral 1 indicates generally the safety devices for the vehicle passengers according to this invention, which devices are installed in the compartment of an automobile 2 directly before and/or behind the heads of the passengers. For example, the safety devices 1, namely the nets mentioned above are secured substantially vertically in the compartment between its ceiling 5 and the top of the back 4 of the seats as close to the driver and passengers of the front seat as possible, as illustrated in FIG. 1. Further, another net is fixedly hung from the ceiling 5 in front of the driver and the passengers in the front seat.

Figure 2:
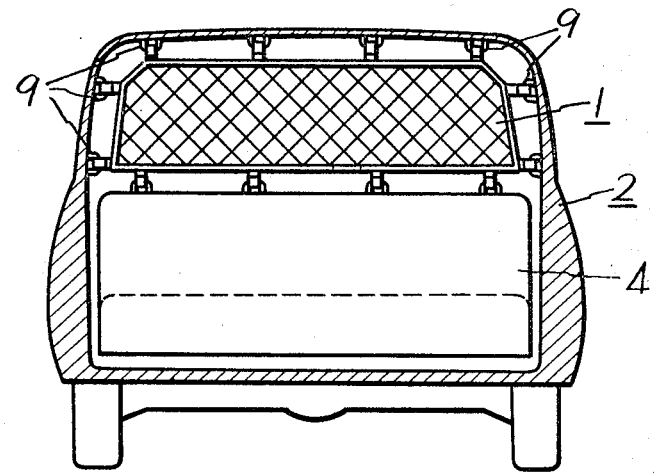
FIG. 2 is a longitudinal-sectional view taken along the line II—II in FIG. 1.

FIG. 2 is a cross-sectional view taken along the line II—II in FIG. 1, illustrating the entire lay-out of one example of the safety device 1.

FIG. 3 is an enlarged fragmentary elevational view of the safety device 1 according to this invention. In the figure reference numeral 6 designates a frame which is formed of an elastic and strong material such, for example, as nylon or the like. Reference numeral 7 indicates a net made up of cords or strands 7' of a similar material, for example, nylon yarn, which net 7 is laid on the frame 6 at a suitable initial tension. The net 7 is made in the following manner. That is, a plurality of threads of strong and relatively elastic nylon, tetron or like yarn are twisted or interwined into cords 7' in such a manner as to extend suitably when subjected to a tensile force (including a force having a tensile component) but may gradually shrink substantially to its initial length upon removal of the tensile force. Then, the cords 7' are woven into a knotted or Raschel knotless net, and the net 7 is stretched on the frame 6 as mentioned above. The initial tension of the net 7 referred to hereinabove is a tension at which the net 7 is stretched on the frame 6 in such a manner that when the head of the occupant in the automobile crashes into the net 7 stretched substantially flush with the frame 6 in the event of, for example, a crash, the moving distance of the head could be held less than 15 cm. from the position of its impact on the net 7 so long as the net 6 is not broken. The reason is that when the passenger's head is caused to turn by an impact and its rotational angle, (for example, about the joint of the neck) exceeds approximately 47°, the so-called "whiplash" phenomenon is resulted and that the moving distance of the head corresponding to the rotational angle 47° is about 15 cm. Reference numeral 8 identifies means for fastening the frame 6 holding the net 7 to fixed support members 9 of a metal arranged, for example, in the compartment at convenient locations, and the fastening means 8 are fixed at one portion to the frame 6.

According to my strength tests of the net in which a solid block of substantially the same shape and weight as a man's head was thrown against the net on the assumption that a shock of the so-called secondary collision in an automobile crash was, for instance, approximately 50 G, it has been ascertained that the net well withstands and sufficiently absorbs the shock of the value referred to just above. This implies that, in the case where an unfastened object in an automobile would crash into the net at an acceleration of less than 50 G when involved in a collision, the net could well absorb the shock of the secondary collision without being broken. Further, it would be expected that a shock of an acceleration exeeding 50 G could well be absorbed by the provision of a double net. Accordingly, the net 7 can be expected to absorb and damp a considerable impact force without causing the so-called "whiplash" phenomenon in the event of an actual automobile accident.

In FIGS. 4 and 5 there are illustrated on an enlarged scale one example of the fastening means, namely a fastening band 8 of the safety device 1 described above. The fastening band 8 secured at one end to the frame 6 is trained about a substantially C-shaped fixed support member 9 and is clamped at the free end by a clamping member 11 such as a buckle or the like. This facilitates installation and removal of the frame 6 and ensures to hold it firmly in position.

In addition, a damper material 10 of, for example, silicon rubber or the like is mounted about the support member 9 at a suitable thickness, which damper material 10 absorbs a shock transmitted thereto from the band 8, namely performs the damping function to limit the forward and backward movement of the frame 6 and hence further prevent the "whiplash" phenomenon such as mentioned previously.

In order to secure the support member 9 to an automobile body, it is fixed at both free end portions to a mounting plate 12, after which the mounting plate 12 is secured by means of screws 13 onto structures such as the ceiling 5, the inner side walls and the backs 4 of the seats 3 in the compartment of the automobile.

A description will hereinbelow be given of the operation and effect of the safety device of this invention in connection with the case where it is provided in an automobile between the ceiling 5 and the back 4 of the front seat 3 directly behind a passenger. If, now, a moving or standing vehicle, for example, an automobile is dashed from behind, the passenger, especially his head is thrown backward into contact with the safety device 1 by its inertia. In such a case, the inertial force of the head is dispersed throughout the net by chain reaction of the tensile force of the net, and at the same time, since each cord forming the net has been made up of a plurality of threads in a manner to be considerably extensible as described above, the inertial force of the head is weakened and absorbed by friction between the threads during extension of the cords, in other words, while the threads making up the cords are extended in a straight line. Therefore, the shock caused by the inertial movement of the head is absorbed by the net 7 almost completely. In this case it is very important that the net or the cords forming it have no elasticity in the general meaning and hence cannot be rapidly restored to its initial condition after once extended. That is, the net of this invention is extensible to some extent but hardly exhibits elasticity in the general meaning. Consequently, even if the entire net is extended by an impact force with the passenger's head thrown against the net, it cannot be immediately restored to its initial condition, so that the head is scarcely subjected to repulsive force resulting from the restoration of the net. This leads to damping of the shock of the inertial movement of the passenger's head caused by a side effect of the collision of his head with the net which is generally referred to as a secondary collision. Namely, there is substantially no possibility to apply to the human body, particularly to its head a reaction which might cause the so-called "whiplash" phenomenon. Accordingly, the net of this invention offers the protection of the passengers against the risks of the so-called "whiplash" injuries in the event of a crash.

The above-described effect has been proved by the following experiments which were conduted on Oct. 9 and 13, 1967 at the Higashimurayama Detached Office of the Machinery Experiment Laboratory of the Industrial Technology Agency of the Ministry of International Trade and Industry of Japan.

The results of the experiments will hereinbelow be described with reference to FIGS. 6 and 7.

FIG. 6 is a graph showing the results of an experiment of a rear-end collision of an automobile not equipped with the safety net of this invention, in which the origin indicates the moment of the rear-end collision, the abscissa represents time in milli-second (ms.) and the ordinate represents in the unit of G the inertial force of a dummy's head in the automobile dashed from behind. For convenience of illustration, the figure indicates the time in a unit of 35 milli-seconds and illustrates the varying conditions of the upper half of the dummy's body in the automobile crashed from behind, corresponding to the time units. In the figure an angle $\theta$ indicates an inclination angle of the top of the head relative to an assumed straight line passing centrally of the dummy's body, and the backward inclination (a clockwise direction in the figure) of the body is referred to as positive and the forward inclination is referred to as negative. A curve $a$ represents the horizontal component of the inertial force G applied to the dummy's head from the moment of the crash, while a curve $b$ indicates the vertical component of the inertial force. The curves $a$ and $b$ are shown in the same graph merely for convenience of illustration and it must be noted that the relative magnitudes of the two components are not indicated.

The particulars of the automobiles used in the experiment of FIG. 6 are as follows:

Automobile crashed from behind (stood still)
    Name: Plymouth Valiant (made in U.S.A.)
    Weight: 1184 kg.
Automobile crashing
    Name: Chevrolet (made in U.S.A.)
    Weight: 1485 kg.
    Speed of crash: 37.4 km./h.

FIG. 7 is a similar graph showing the results of an experiment of a rear-end collision with an automobile equipped with the safety net of this invention. The automobiles used in this expericent are as follows.

Automobile dashed from behind (stood still)
    Name: Chevrolet (made in U.S.A.)
    Weight: 1278 kg.
Automobile crashing
    Name: Chrysler (made in U.S.A.)
    Weight: 1687 kg.
    Speed of crash: 37.6 km./h.

A comparison of the results of the two experiments will hereinbelow be made in detail. As apparent from FIG. 6, it has been found that in the case of the rear-end collision of the automobile having no safety net, the dummy, more particularly its head was subjected to an inertial force of horizontal components of 7.3 G at maximum in a forward direction and 21.3 G in a rearward direction, as indicated by the curve $a$, and vertical components of 26.6 G at maximum in an upward direction and 6.8 G at maximum in a downward direction, as indicated by the curve $b$. It has also been found in this case that the inclination angle $\theta$ amounted to 73° in the backward direction at a time of 210 ms. from the moment of the collision, in other words, in a time of 210 ms. after the moment of the crash.

In connection with the automobile equipped with the safety net, it has been found, as apparent from FIG. 7, that the dummy's head was subjected to an inertial force of horizontal components such as 2.6 G at maximum in the forward direction and 10.2 G at maximum in the backward direction, as indicated by the curve $a'$, and vertical components such as 2.8 G at maximum in the upward direction and 2.8 G at maximum in the downward direction, as indicated by the curve $b'$. It has also been ascertained that the inclination angle $\theta$ was 45° in the forward direction in a time of 210 ms. after the moment of the collision.

A comparison of the results of the experiments shows that the inertial force G exerted to the dummy's head in the rearend crash of the automobile equipped with the safety net is about ⅓ and ½ in the forward and rearward directions of the horizontal components and approximately 1/10 and ⅖ in the upward and downward directions of the vertical components of those of the inertial force G obtained with the automobile having no safety net. This considerable reduction of the inertial force apparently indicates that the cords forming the safety net of this invention weakened and absorbed the inertial force of the dummy's head thrown against the net in the rear-end collision, while at the same time the impact force applied to the net was transmitted sequentially to the cords forming meshes of the net by chain reaction of the tension thereof and was thereby absorbed and damped.

As to the inclination angle θ, the dummy's head in the automobile having no safety net was inclined backwardly through as large an angle as 73°, as mentioned previously. According to the "Federal Motor Vehicle Safety Standards" of the United States of America, a critical value of the backward inclination angle of the passenger's head in a rear-end collision or the like is 70°±10°, an angle exceeding 70° would endanger the life of passengers and an angle more than 80° would kill them. Further, literatures available in Japan disclose that since a man's head is permitted to incline backwards through an angle of only 61° relative to the line running centrally of the human body, the average value of the physiological limit is 61°.

In the experiment, described with FIG. 6, in which the standing automobile having no safety net was crashed from behind at the speed of 37.4 km./h., the inclination angle of the dummy's head was 73° greatly exceeding the physiological critical angle, as previoulsy mentioned. Consequently, in such a rear-end collision a passenger in the automobile crashed would hardly survive, and if saved, he would suffer seriously the "whiplash" injuries. In the case of a rear-end collision of an automobile equipped with the safety net, the inclination of the dummy's head in the experiment of FIG. 7 is only 45° in the forward direction from its normal position and the angle of the forward inclination is appreciably smaller than the aforementioned physiological critical value 61°. Accordingly, in this case the danger to life of the passenger resulting from the inclination of his head could be prevented without fail.

As has been described in the foregoing, the safety net of this invention greatly reduces the inclination angle of the passenger's head in the event of a rear-end collision and hence minimizes unwanted influences upon his body by the impact of the collision. Thus, the safety net fully protects the passengers against collisions.

The safety net of this invention overcomes the aforementioned problems of concussion of the brain and the harmful excessive inclination of a passenger's neck. Namely, it will easily be understood that the safety net weakens and absorbs the inertial force applied to a passenger's head in the case of a crash and greatly decreases the inclination angle of his neck.

In addition, the safety net of this invention can be stretched in front of the driver without obstructing his view during travel, ensuring to restrain him from crashing into the front glass in the event of a head-on collision.

In the present invention a material, for example, the damper material 10 capable of elastically damping and absorbing a shock is formed about each fixed support member 9 for further ensuring the safety of the net, as above described. Therefore, although the frame 6 itself is vibrated by the crash of the passenger's body into the net to exert a shock to the support members 9, the shock is fully weakened by the damper material 10 itself, and hence the inertial force of the passenger's head can be absorbed by the damper material 10.

Further, the aforementioned nylon cords are considerably fine, so that even if the frame having laid thereon the net woven from the fine nylon cords is disposed in front or rear of a passenger, it scarcely obstruct his view. The use of transparent nylon cords would less obstruct the passenger's view. The concept of employing such a safety device cannot be ever derived from the conventional types of safety devices such as, for example, the auto-pillow.

In addition, the safety device of this invention can be manufactured more cheaply than any of the prior devices, for example, the auto-pillow, and its installation and removal are not so difficult.

Figure 8:
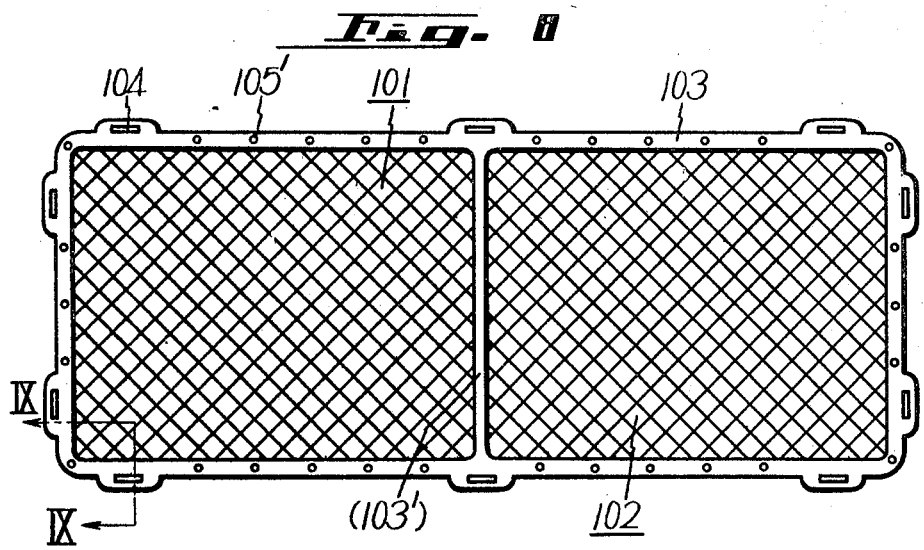
FIG. 8 illustrates in elevation another example of a safety net according to this invention.

FIG. 8 is a front view illustrating another example of the safety device of this invention. In the figure the reference numeral 101 designates generally the safety device, which consists of a net 102 formed with suitable meshes from a strengthened synthetic resinous material such as, for instance, as polypropylene or nylon by means of molding and a frame 103 for holding the net 102 at its margin, which frame is likewise formed of a similar material by means of molding. In this case the net 102 is attached to the frame 103 in a manner to be substantially flush therewith. The net 102 and the frame 103 may be formed integrally from the same material by means of molding. It is perferred to provide an auxiliary frame 103' across the frame 103 substantially at the center thereof. Further, a plurality of elongated slots 104 are formed in the frame 103 along its marginal edges, and small apertuers 105' may be bored through the frame 103 between the slots 104, as illustrated in FIG. 8. The safety device 101 is positioned on the back of the seat of an automobile in the following manner. In a manner similar to that in FIGS. 2 to 5, cords or bands are passed through the slots 104 and the bands are secured to the metal fixing members provided on the ceiling and side walls of the compartment and the seats, thus fixedly attaching the safety device 101 to a vehicle such as an automobile or the like.

Figure 9:
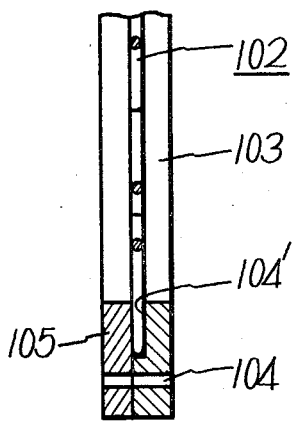
FIG. 9 is an enlarged cross-sectional view taken along the line IX—IX in FIG. 8.

In order to attach the net 102 to the frame 103, a recess 104' is formed in the frame 103 along its inner marginal edge, as shown in FIG. 9, and the marginal edge of the net 102 is inserted into the recess 104', on which is placed a thin plate 105 made of a similar material in substantially the same shape as those of the frame 103, and then the frame 103 and the plate 105 are bound together by, for example, an adhesive binder with the margin of the net 102 being gripped therebetween. In this case, it is also possible that a damper material such as silicon rubber is inserted into the space between the recess 104' of the frame 103 and the plate 105 together with the margin of the net 102, ensuring further damping and absorption of a shock applied to the net 102.

The net 102 can be secured to the frame 103 in a different way. That is, reticulated grooves of substantially the same shape as that of the net 102 are formed in the frame 103 at a place corresponding to the recess 104' of the frame 103, though not shown, and the meshes of the marginal portion of the net 102 are embedded in the grooves and then they are adhered to each other by means of an adhesive binder or the like. In this case, a thin plate 105 similar to that depicted in FIG. 9 may be adhered to the frame 103 over the grooved portion.

Figure 10:
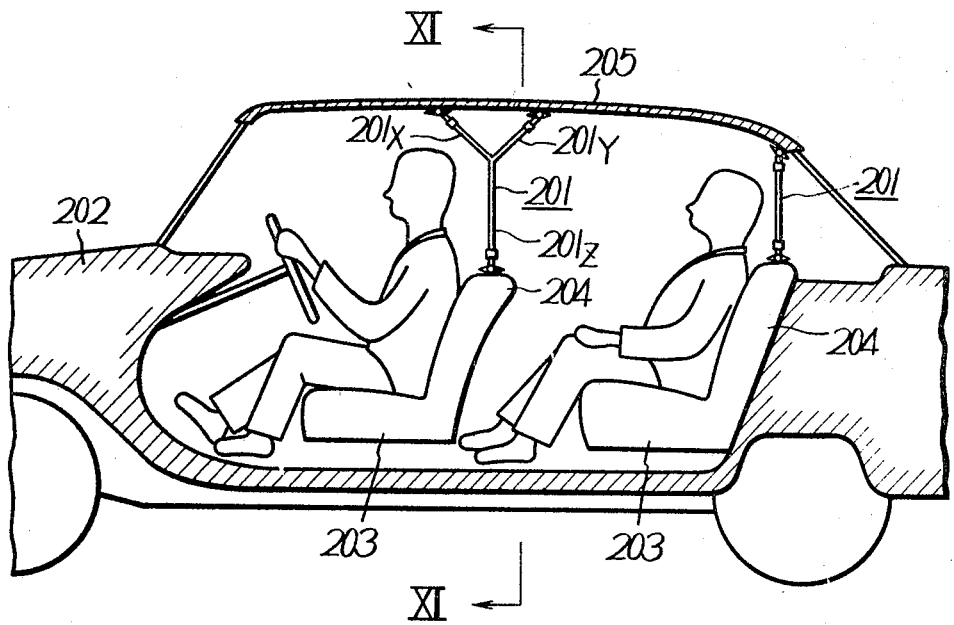
FIG. 10 is side view of an automobile equipped with another example of the safety device of this invention having one portion of the automobile broken away.

In FIG. 10 there is illustrated another example of the safety device of this invention. Reference numeral 201 indicates generally the safety device, which is formed in a substantially Y-shaped configuration in its side view. That is, the safety device consists of three net portions 201X, 201Y and 201Z and is stretched between the top of the back 204 of the front seat 203 of an automobile 202 as close to the passenger as possible and the ceiling 205 of the compartment. In this case the safety device 201 is arranged in such a manner that the plane of the net portion 201Z is substantially vertical by securing the marginal edges of the free ends of the net portions 201X and 201Y onto the ceiling 205 and that of the net portion 201Z onto the top of the back 204 of the seat 203.

Figure 11:
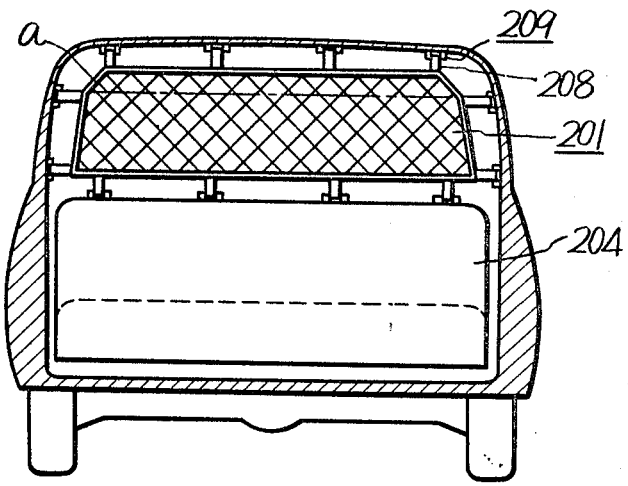
FIG. 11 is a longitudinal-sectional view taken along the line XI—XI in FIG. 10.

Referring now to FIGS. 11, 12 and 13, the example shown in FIG. 10 will hereinbelow be described more in detail. Reference numeral 206 designates a frame formed of an elastic and strong material such as, for example, nylon, and its upper portion is formed in a forked shape, namely substantially Y-shaped. Reference numeral 207 identifies a net woven from cords 207' made by knitting, for example, nylon yarn, which is a similar material of the frame 206. The net 207 consists of three net portions 201Z, 201Y and 201X, which are joined together at a line a, and the net 207 is stretched on the frame 206 at a suitable initial tension. In this case, the joint of the three net portions 201X, 201Y and 201Z is formed flexible and the net 207 consisting of the three net portions 201X, 201Y and 201Z is stretched on the frame 206 in a manner to be substantially Y-shaped in cross-section. The frame 206 having stretched thereon the net 207 is installed in a vehicle compartment by means of, for example, bands 208 and fixed securing members 209 in such a manner that the net portion 201Z may extend substantially vertical on the top of the back 204 of the seat 203 and that the other net portions 201X and 201Y may extend aslant in opposite directions from the connecting line *a* up to the ceiling of the compartment. The net 207 is arranged so that the connecting line *a* of the portions 201X, 201Y and 201Z may assume a position corresponding to the back of the head of the passenger.

With reference to FIGS. 14 and 15 a description will be given of one example of the securing means, that is, the securing member 209 for securing the safety device 201 in a vehicle.

As illustrated in the figures, the securing members 209 each consists of a lower support member 210 of a substantially shallow U-shaped cross-section fixed onto the top of the back of the seat, an upper support member 211 of a similar cross-section arranged to cover the lower support member 210. Then lower and upper support members 210 and 211 are assembled together by a pin 212 having pivoted thereto at both ends the upwardly and downwardly projecting flanges of the support members 210 and 211. The free end portion of the band 208 fixed at one end to the frame 206 is passed between the pin 212 and the lower support member 210 and is then fitted into a slot 215 bored through the upper support member 211. Springs 214 are provided on both end portions of the pin 212, by means of which one marginal edge of the upper support member 211 pivoted to the pin 212 is pressed against the lower support member 210 to firmly hold the belt 208 therebetween. Thus, the frame 206 is firmly fixed to the vehicle. While, the belt 208 can readily be moved by pushing the other marginal portion of the upper support member 211 against the springs 214, so that the belt 208 can be disessembled from the securing member 209. In the figures reference numeral 213 designates a guide roller formed on the periphery of the pin 212, for guiding the band 208.

The operational effects of the safety device 201 exemplified in FIG. 10 are substantially the same as those in the foregoing examples. It has been found in my experiment that in the event of a head-on collision a passenger, for example, in the rear seat is caused to move forwardly while rising to his feet by an inertial force of the impact of the collision. Accordingly, his head moves aslant and strikes against the ceiling of the compartment. With the safety device depicted in FIG. 10, the upper part of the net is forked into two portions and the portion 201Y is secured aslant to the ceiling, so that the passenger's head would not strike directly against the ceiling but the portion 201Y, and the impact force is thereby damped and absorbed. Thus, the head of the passenger in the rear seat is protected safely in the event of a head-on crash.

FIGS. 16 to 21 illustrates another example of the securing means of the safety device of this invention.

Generally, it is very difficult but important to install the safety device in a vehicle compartment at a predetermined position in a manner to fully exhibit its shock-absorbing function.

Unnecessary projections in a vehicle compartment are very dangerous, since there is the possibility that in the case of sudden stoppage, a collision or the like the passenger would strike against the projections to receive unexpected injuries. Recently, there is a tendency of regulating prohibition of the provision of unnecessary projections in the compartment.

Thereore, in the installation of the safety device in a vehicle compartment, it is highly desirable to avoid projecting individual member of the securing means for the safety device. The securing means depicted in FIGS. 16 to 21 are excellent which avoid the difficulties encountered in the mounting of the safety device and rather enhance the shock-absorbing function of the safety device than lower it.

A description will be given of the securing means for the safety device with reference to FIGS. 16 to 21. There is, a support plate 302 made of, for example, metal or synthetic resin and having formed therethrough a plurality of apertures 301 is attached to the inner side walls or the ceiling of, for instance, a vehicle automobile compartment in adjacent but spaced relation thereto. A suspension cord 303 made of, for example, nylon or the like is inserted between the support plate 302 and the ceiling and is pulled down through the apertures in the form of loops as at 304, and the marginal portion of the safety device is entwined with the loops 304 with cords 307 passed therethrough. In this manner, the safety device is mounted in the automobile.

Figure 16:
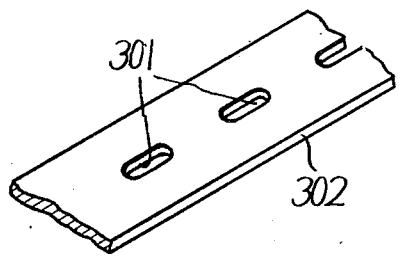
FIG. 16 is an enlarged perspective view showing one portion of a support plate used in another example of the securing means for the safety device of this invention.

FIG. 16 is an enlarged perspective view of one portion of the support plate 302, which has bored therethrough the plurality of apertures 301 in its lengthwise direction at predetermined intervals. The support plate 302 is attached to, for example, the ceiling of the compartment by means of screw 308 in close but spaced relation to the ceiling so as to minimize projection of the plate 302 into the compartment, and the suspension cord 303 is inserted between the ceiling and the support plate 302. In some cases, the support plate 302 is attached to the ceiling in a manner to hold the cord 303 between the ceiling and the support plate 302. Then, the portions of the cord 303 overlying the apertures 301 of the support plate 302 are pulled out down through the apertures 301 to provide the loops 304 respectively. The cord 307 is entwined with a margin, for example, the frame 306 of the safety net 305 and with the loops, thus securing the safety net 305 in the automobile. In this case, the cords of the safety net may be entwined directly with the loops 304, without employing the frame 306 and the cord 307. Further, it is also possible that the support plate 302 having the suspension cord 303 prevciously bound thereto by, for example, an adhesive binder is attached to the ceiling or the like with the cord 303 being held therebetween. In this case, the loops 304 are, of course, formed in advance.

Figure 17:
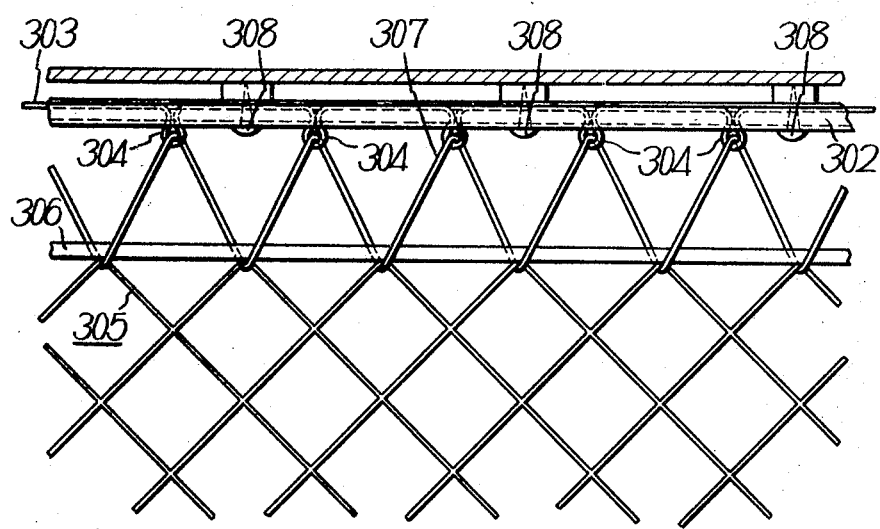
FIG. 17 is a fragmentary view in elevation of the safety net secured to the ceiling of an automobile by the use of the securing means mentioned with FIG. 16.
Figures 18, 19:
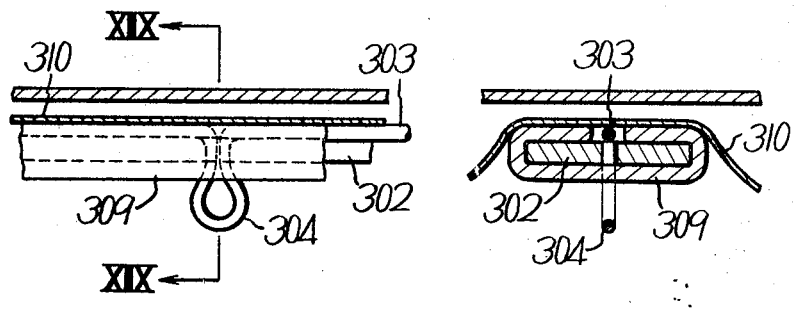
FIG. 18 is an enlarged fragmentary view of the securing means depicted in FIG. 17.
FIG. 19 is a cross-sectional view taken along the line XIX—XIX in FIG. 18.

FIG. 18 illustrates, on a further enlarged scale, one portion of FIG. 17, in which the cord 307 and the safety net 305 are removed. FIG. 19 is a cross-sectional view taken along the line XIX—XIX in FIG. 18, in which the support plate 302 is covered with an elastic damper material 309 such as nylon, rubber or the like, so that even if a passenger's head should hit directly the support plate 302, the shock could be damped by the damper material 309. It is a matter of course that the damper material 309 has formed therethrough similar apertures at places corresponding to the apertures 301 of the support plate 302.

Figure 21:
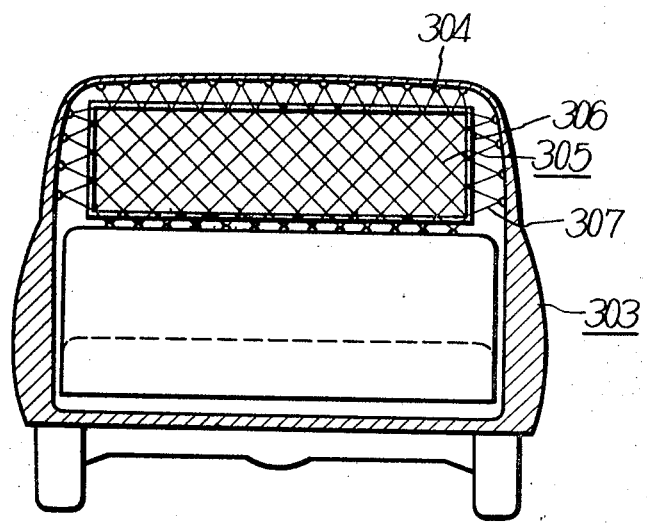
FIG. 21 is a cross-sectional view taken along the line XXI—XXI in FIG. 20.

With the securing means described above, the safety device is installed in a vehicle in the following manner. That is, the support plates 302 described above are first fixed by screws or the like to the ceiling and the inner side walls of the compartment and onto the top of the back of the seat at places corresponding to the location where the safety device is to be disposed. The suspension cords 303 inserted between the support plates 302 and the ceiling and so on are pulled out throught the apertures 301 of the support plates 302 to provide the loops 304, after which the safety device is brought to its predetermined location. Then, the marginal portion or frame 306 of the safety device and the individual loops 304 are entwined with the cords 307 and the pulling force of the cords 307 is suitably adjusted and the ends of the cords 307 are then fixed. In this manner, the safety device 305 is stretched at a predetermined tension, as depicted in FIG. 21.

Figure 20:
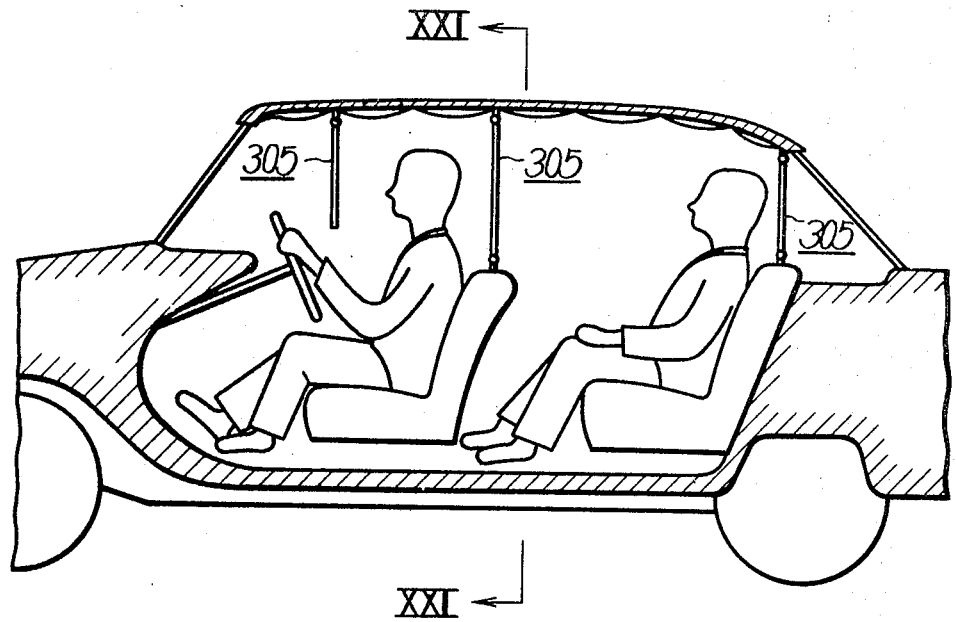
FIG. 20 is a side view of an automobile equipped with the safety devices secured in the automobile by the securing means shown in FIG. 17, with one portion of the automobile broken away.

As described above, the safety device 305 can be installed in the compartment of an automobile or the like by the steps of fixing the supported plates 302 to those portions of the compartment corresponding to the location of the safety net, providing the loops 304 by pulling out the suspension cords 303 through the apertures 301 of the support plates 302, entwining the loops 304 and the frame 306 of the safety device 305 with the cords 307 and fixing the cords 307. Accordingly, the installation of the safety device is very easy. Further, the thickness of the support plates 302 can be made very small and they are closely attached to the ceiling and side walls, so that they hardly project into the compartment. In this regard, the support plate 302 is attached to the ceiling, depressed from its lining as depicted in FIG. 19 or 20. Accordingly, there is substantially no possibility that any disadvantage is caused by providing the support plates 302 in the compartment.

In addition, since the safety device 305 is secured to the support plates 302, namely to an automobile by the cords 307, it might be said that the safety device is resiliently secured to the vehicle. Consequently, when the passenger is thrown against the safety net, he is, of course, protected from a shock by the safety net itself as described previously, and further the cords 307 serve to absorb and hence weaken the shock applied to the safety device 305. At the same time, the cords 307 further absorb the shock by friction at its portions engaging with the cords 303 and the frame 304, thus further enhancing the effect of the safety net.

Figure 22:
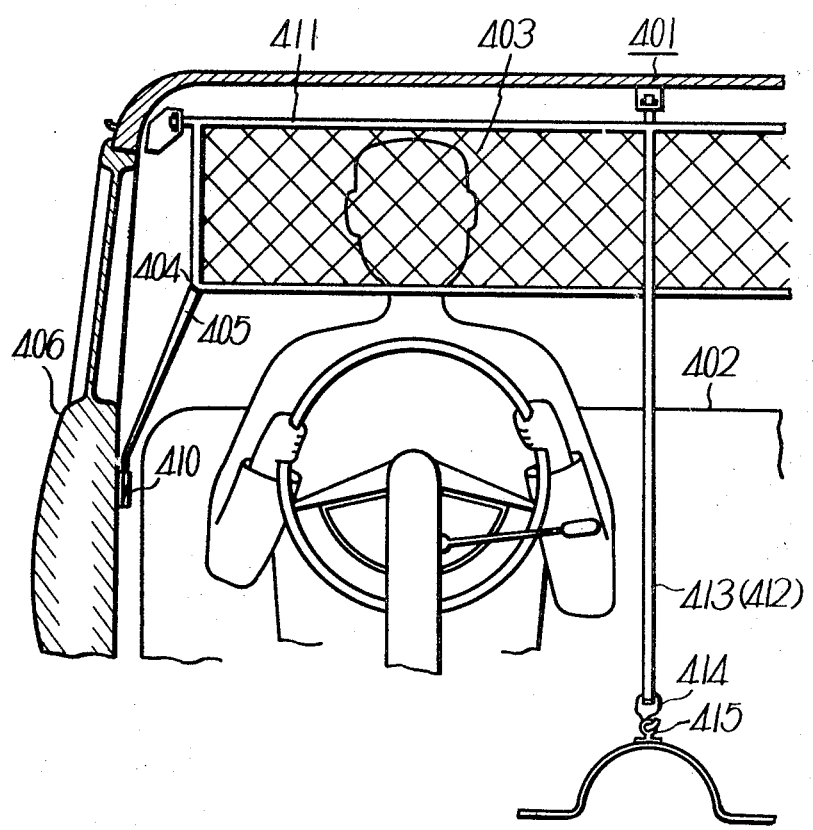
FIG. 22 is a fragmentary view in elevation of the safety net stretched and secured in an automobile between a passenger of the front seat and the front glass by the use of another example of the securing means according to this invention.
Figure 23:
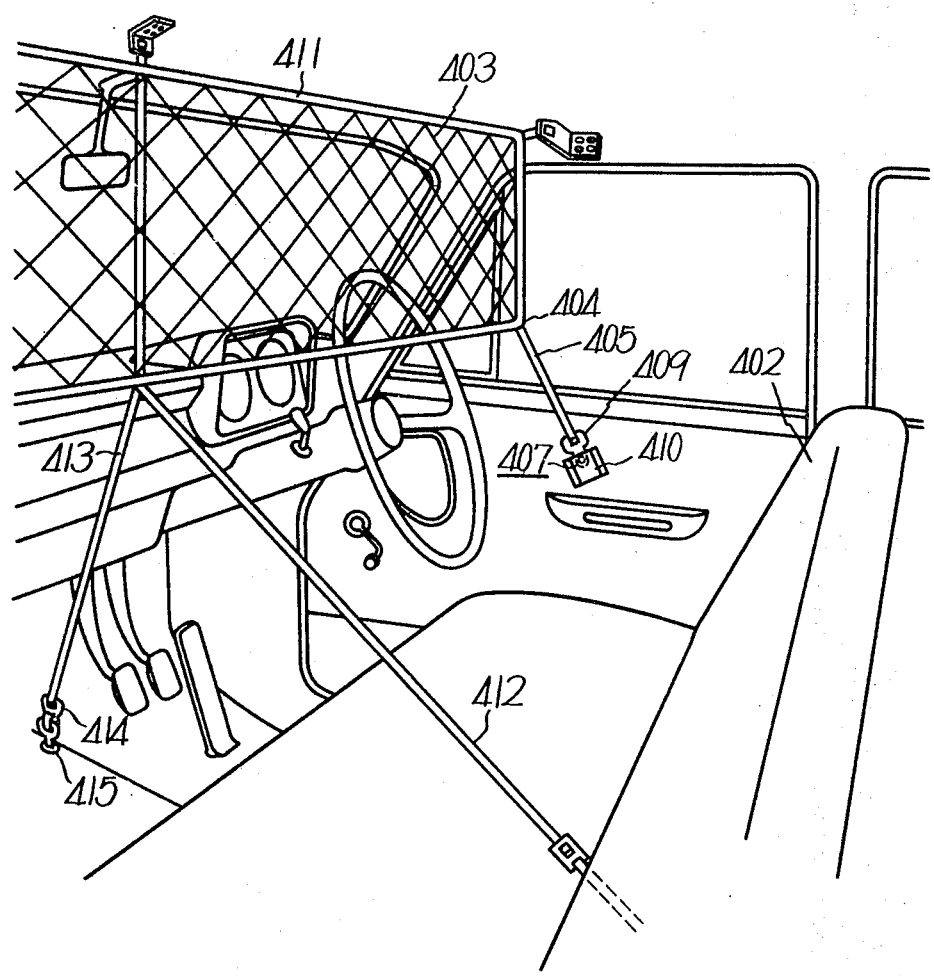
FIG. 23 is a perspective view of the safety net, seen from the back seat.

Referring now to FIGS. 22 and 23, a description will be given, by way of example, of the provision of the safety device in a vehicle such as an automobile, for example, between the front glass and a passenger in the front seat. As depicted in FIGS. 22 and 23, a safety net identified by 403 is placed substantially vertically between the front seat 402 and the front glass of a vehicle 401 such as an automobile at a location corresponding to the entire area of the front glass in such a manner that the passenger's head in the front seat faces opposite to the safety net 403. In this case, one end of a band 405 made of a flexible material such as nylon or the like is fixed to the lower corner 404 of the safety net 403 and a metal securing member 409 having an aperture 408 is fixed to the free end portion of the flexible band 405. A buckle 410 for clamping the securing member 409 is mounted on the inside of the door 406 at a predetermined position, which buckle 410 firmly holds the securing member 409. The securing member 409 and the buckle 410 constitute securing means 407. With the securing means 407, the underside of the safety net 403 is secured to the body of the automobile at a suitable tension. The fixing of the upper and side margins of the safety net 403 may be effected by connecting its upper corners and its central portion with the side walls and the ceiling of the compartment by suitable means such as bands and securing means or the like. This fixing may be effected by such means as employed in the foregoing examples or by some other suitable means.

In order to stretch the safety net 403 more uniformly, it is required to fix the central portion of the lower margin of a frame 411 of the safety net 403. In this case, for example, two flexible bands 412 and 413 are attached at one end to the center of the lower margin or the frame 411 of the safety net, while their free ends have respectively mounted thereon, for example, snap hooks 414. While, eyebolts 415, for example, for receiving the snap hooks 414 are fixed to the floor and the seat at predetermined positions and the snap hooks 414 are respectively engaged with the eyebolts 415 for serving the purpose of ensuring uniform stretching of the net.

It is, of course, possible to adjust suitably the tensile force of the bands 404, 412 and 413 by providing clamping members on the intermediate portions of the bands, as indicated in FIG. 23 by 412'.

Figure 24:
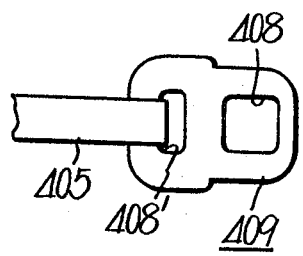
FIG. 24 is a front view showing one example of a metal securing member used in the securing means depicted in FIGS. 22 and 23.
Figure 25:
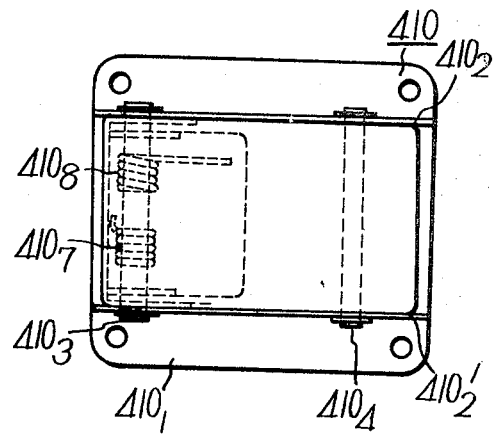
FIG. 25 is a plan view showing one example of a buckle for holding the metal securing member depicted in FIG. 24.

FIG. 24 illustrates one example of the securing member 409, which is a thin metal plate of a substantially square configuration having bored therethrough apertures 408 and 408'. The band 405 is passed through the aperture, for example, 408' and is fixed at its free end, as depicted in the figure.

While, the buckle 410 consists of a thin metal base plate $410_1$ fixed to the inside of the door of the automobile by means of screws or the like, a pair of opposed lugs $410_2$ and $410_2'$ made of a metal material and planted substantially vertical on the base plate $410_1$ in parallel relation to each other, a pair of parallel pins $410_3$ and $410_4$ made of a metal material or the like provided between the lugs $410_2$ and $410_2'$ in a spaced relation to the base plate $410_1$, a lever $410_5$ of a substantially L-shaped cross-section made of a resinous material such as Bakelite or the like and pivoted at one end to the pin $410_3$ between the lugs $410_2$ and $410_2'$, and a lever $410_6$ made of metal and similarly pivoted at one end to the pin $410_3$ between the lugs $410_2$ and $410_2'$. Further, coiled springs $410_7$ and $410_8$ are disposed respectively between the levers $410_5$ and $410_6$ and the pin $410_3$. Namely, the coiled springs $410_7$ and $410_8$ are fixed at one end to the pin $410_3$ and are engaged at the other end with the levers $410_5$ and $410_6$, yielding a biasing force tending to turn the levers $410_5$ and $410_6$ about the pin $410_3$ in directions indicated by arrows $a_1$ and $a_2$ respectively. The pin $410_4$ serves as a stopper to prevent movement of the lever $410_5$ in the direction of the arrow $a_1$ urged by the coiled spring $410_7$. While, the underside of the lever $410_6$ has a protrusion $410_9$ and the base plate $410_1$ has formed therein a groove $410_{10}$ for receiving the protrusion $410_9$.

The protrusion $410_9$ is normally retained in the groove $410_{10}$ by the action of the coiled spring $410_8$. Under such conditions, when the securing member 409 is inserted between the lever $410_6$ and the base plate $410_1$ of the buckle 410, the top end portion of the securing member 409 engages with the protrusion $410_9$ of the lever $410_6$ fitted into the groove $410_{10}$ of the base plate $410_1$ to push it along the inclined surface of the protrusion $410_9$, causing the lever $410_6$ to turn in the direction of the arrow $a_3$ against the biasing force of the coiled spring $410_8$ (refer to FIG. 26). Accordingly, the protrusion $410_9$ is disengaged from the groove $410_{10}$ to provide a clearance or gap between the lever $410_6$ and the base plate $410_1$. The securing member 409 is further pushed into the gap and when the aperture 408 of the securing member 409 is aligned with the groove $410_{10}$ of the base plate $410_1$, the force against the biasing force of the coiled spring $410_8$ for the protrusion $410_9$ of the securing member 409 is released and the lever $410_6$ is turned again in the direction of the arrow $a_2$ by the biasing force of the coiled spring $410_8$ acting on the lever $410_6$, thereby urging the protrusion $410_9$ into the aperture 408. Thus, the securing member 409 is firmly held by the buckle, as illustrated in FIG. 26.

Figure 26:
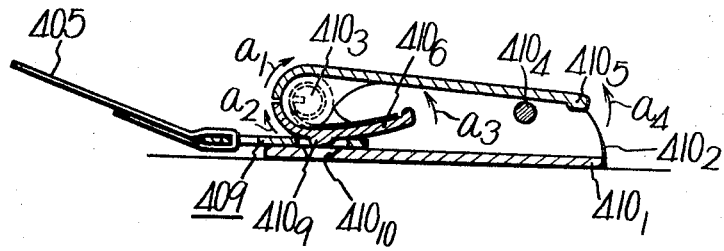
FIG. 26 is a cross-sectional view illustrating the metal securing member assembled with the buckle.
Figure 27:
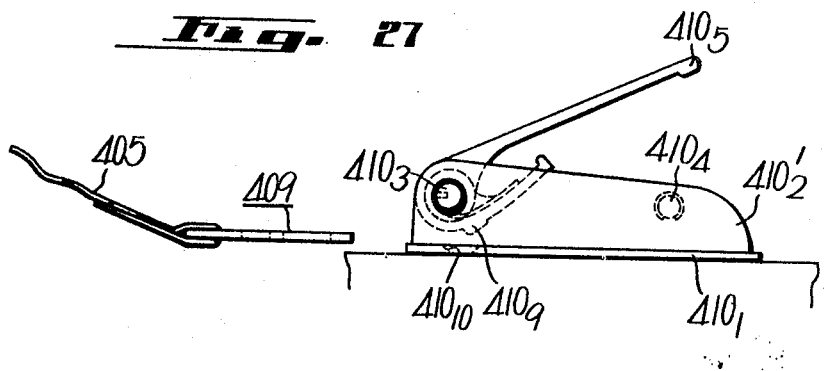
FIG. 27 is a side view of the metal securing member dis-assembled from the buckle.

Under such conditions as shown in FIG. 26, turning of the lever $410_5$ in the direction of the arrow $a_4$ causes the lever $410_5$ to turn about the pin $410_3$ to push the lever $410_6$ engaged therewith against the biasing force of the coiled spring $410_8$, urging the lever $410_6$ in the direction of the arrow $a_3$. As a result of this, the protrusion $410_9$ is disengaged from the aperture 408 of the securing member 409, so that the securing member 409 is disassembled from the buckle 410, as depicted in FIG. 27. Namely, the lever $410_6$ is moved away from the base plate $410_1$ to provide a gap therebetween, and hence the securing member 409 can readily be disassembled from the buckle 410.

Referring now to FIGS. 28 to 30, a description will be given of one example of the securing means for fastening the bands 412 and 413 for fixing the central portion of the net to the stationary part of the automobile. The snap hook 414 is made of a thin metal plate, which has fixed thereto at one end the central band 412 or 413 and has formed therein at the other end a hook $414_1$, and further a locking member $414_2$ of the hook $414_1$ is pivoted to the major portion of the snap hook 414 by a pin $414_3$. In addition, a spring $414_4$ is provided for biasing the locking member $414_2$ in a manner such that the hook portion is normally closed by the locking member $414_2$.

While, the eyebolts 415 each having an aperture $415_1$ for engagement with the hook $414_1$ such as depicted in FIG. 29 are fixed on to the floor and the front seat of an automobile. The eyebolt fixed to the seat is embedded deep in the joint of the seat with its back so as not to project on the surface of the seat.

The snap hooks 414 are hooked on to the eyebolts 415, by which the bands 412 and 413 and consequently the central portion of the frame 411 having stretched thereon the safety net 403 is firmly fixed, as illustrated in FIG. 30. The snap hook 414 and the eyebolt 415 are engaged with and disengaged from each other in a known manner, and accordingly no detailed description will be given in this regard.

Although the securing means have described in connection with the case where the safety net is secured in the automobile by connecting it to the front seat and the doors, the securing means may be employed for securing the safety net to the rear seat and other places.

The securing means described above facilitate installation and removal of the safety net in or from a vehicle such as an automobile or the like. Further, since the bands can easily be attached to and detached from the door, they do not obstruct the opening and closing of the door.

In addition, the securing means do not ever lower the operational effect of the safety net.

Moreover, the door of the automobile or the like is firmly connected with the safety net in its closed condition, which prevents unnecessary opening of the door owing to a trouble in the door lock. This ensures the prevention of an unexpected accident such that in the case of a collison a passenger is thrown out from the automobile through a door opened by the impact of the collision and is run over by a following vehicle.

It will be apparent that many modifications and variations may be effected without departing from the scope of the novel concepts of this invention.

I claim as my invention:

1. A safety device for passengers of an enclosed automotive vehicle comprising a net formed from plastic cords capable of being extended by an external force applied against the net and of being gradually restored to some extent from its extended condition upon removal of said extended force, a frame for supporting said net in a taut condition, spaced supports on the top, sides and seat back of said vehicle for fastening said frame thereto, bands or cords attached to one end to said frame and at the other end to said supports, said bands or cords holding said net in taut condition with at least a portion of the net in substantially vertical position close to the back of the heads of the passengers to be protected, and damper material interposed between each support and the end of the band or cord attached thereto to absorb shock transmitted from the band or cord to the support, whereby the heads of said passengers are prevented from being inclined excessively rearward and suffering "whiplash" injury in the event of a rear end collision.

2. A safety device for vehicle passengers as claimed in claim 1 wherein the net is made of a synthetic resinous material such as polypropylene by means of molding and the frame is made of a synthetic resinous material such as polypropylene by means of molding.

3. A safety device for vehicle passengers as claimed in claim 1 wherein the net is made of a synthetic resinous material such as nylon by means of molding and the frame is made of a synthetic resinous material such as nylon by means of molding.

4. A safety device for vehicle passengers as claimed in claim 1 wherein the net and frame are made integrally from a synthetic resinous material such as nylon by means of molding.

5. A safety device according to claim 1 wherein said net tautness is of a degree as to prevent movement of the head a distance less than 15 cm. and of a strengh to absorb the shock of acceleration of approximatealy fifty times gravity.

6. A safety device according to claim 1 wherein said cords are made of a plurality of threads in frictional engagement so that upon extension of the cords under force the shock is absorbed in part by the friction between the threads.

7. A safety device according to claim 1 wherein the net or cords have no general elasticity and hence cannot be rapidly restored to the initial condition after once being extended whereby no repulsive force is imparted to the absorbed object.

References Cited

UNITED STATES PATENTS

| 1,534,377 | 4/1925 | Furiate | 296—84 |
| 3,310,342 | 3/1967 | Drelichowski. | |
| 3,366,977 | 2/1968 | Koehler | 160—327 |

FOREIGN PATENTS 962,946   7/1964   Great Britain.

BENJAMIN HERSH, Primary Examiner

R. R. SONG, Assistant Examiner

U.S. Cl. X.R.

269—84

UNITED STATES PATENT OFFICE
CERTIFICATE OF CORRECTION

Patent No. 3,525,535    Dated August 25, 1970

Inventor(s) Yasusaburo Kobori

It is certified that error appears in the above-identified patent and that said Letters Patent are hereby corrected as shown below:

Column 5, line 56, "conduted" should read -- conducted --.
Column 8, line 11, "apertuers" should read -- apertures --.
Column 9, line 35, "disessembled" should read -- disassembled --.
Column 10, line 35, "prevciously" should read -- previously --.

Signed and sealed this 20th day of July 1971.

(SEAL)
Attest:

EDWARD M. FLETCHER, JR.　　　　　　　　WILLIAM E. SCHUYLER, JR.
Attesting Officer　　　　　　　　　　　Commissioner of Patents